United States Patent
Suetsugu et al.

(10) Patent No.: US 8,140,917 B2
(45) Date of Patent: Mar. 20, 2012

(54) STREAM RECOVERY METHOD, STREAM RECOVERY PROGRAM AND FAILURE RECOVERY APPARATUS

(75) Inventors: Tomohiro Suetsugu, Yokohama (JP); Satoru Watanabe, Yokohama (JP); Eri Kubo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 12/713,056

(22) Filed: Feb. 25, 2010

(65) Prior Publication Data
US 2010/0235681 A1    Sep. 16, 2010

(30) Foreign Application Priority Data
Mar. 13, 2009   (JP) .................................. 2009-060766

(51) Int. Cl.
*G06F 11/00* (2006.01)
(52) U.S. Cl. .............................. 714/50; 714/15; 714/43
(58) Field of Classification Search ..................... 714/15, 714/43, 50
See application file for complete search history.

(56) References Cited

U.S. PATENT DOCUMENTS

| | | | | |
|---|---|---|---|---|
| 4,336,611 | A * | 6/1982 | Bernhardt et al. | 714/768 |
| 7,076,573 | B2 * | 7/2006 | Allen et al. | 710/17 |
| 7,472,139 | B2 | 12/2008 | Nishikawa et al. | |
| 7,844,856 | B1 * | 11/2010 | Ahal et al. | 714/19 |
| 7,895,474 | B2 * | 2/2011 | Collins et al. | 714/15 |
| 2004/0107389 | A1 * | 6/2004 | Brown et al. | 714/50 |
| 2006/0053339 | A1 * | 3/2006 | Miller et al. | 714/15 |

* cited by examiner

*Primary Examiner* — Robert Beausoliel, Jr.
*Assistant Examiner* — Joshua P Lottich
(74) *Attorney, Agent, or Firm* — Foley & Lardner LLP (57) ABSTRACT

Stream data is structured including data tuples as a query process target and a recovery point tuple for indicating a position of the data tuples in the stream data. Upon detection of a failure at a computer, another computer reads position information in the stream data indicating a position of data tuples already subjected to the query process by a stream processing apparatus from a recovery points, uses the recovery point positioned lastly among the read recovery points as a reenter point of the input stream, and instructs a stream distribution apparatus to reenter the input stream starting from the reenter position into the other computer.

10 Claims, 13 Drawing Sheets

(a) EXAMPLE OF STRUCTURE OF RECOVERY POINT TUPLE

61 RECOVERY POINT TUPLE

| TIME | DATA (STREAM ID) | FLAG (TUPLE TYPE) |
|---|---|---|
| 10:10.012 | 00000001 | RECOVERY POINT TUPLE |
| 10:20.022 | 00000002 | RECOVERY POINT TUPLE |

(b) EXAMPLE OF CONTENTS OF MANAGEMENT TABLE OF RECOVERY POINT MANAGEMENT MODULE

47 MANAGEMENT TABLE

| STREAM ID | TIME | NUMBER OF BRANCHES | NUMBER OF OUTPUTS |
|---|---|---|---|
| 00000001 | 10:10.012 | 2 | 0 |
| 00000002 | 10:20.022 | 1 | 0 |

(c) EXAMPLE OF STRUCTURE OF RECOVERY POINT IN DISK 35

62 RECOVERY POINT

| STREAM ID | TIME |
|---|---|
| 00000001 | 10:10.012 |
| 00000002 | 10:20.022 |
| 00000002 | 10:50.022 |
| 00000001 | 11:50.112 |

(a) ADD RECOVERY POINT TUPLE EVERY PREDETERMINED INPUT AMOUNT (E.G., EVERY 1000 TUPLES)

(b) ADD RECOVERY POINT TUPLE EVERY PREDETERMINED TIME (E.G., EVERY ONE MINUTE)

(c) ADD RECOVERY POINT TUPLE BY DETECTING INCREASE IN HARDWARE AMOUNT INCREASE IN HARDWARE

STREAM RECOVERY METHOD, STREAM RECOVERY PROGRAM AND FAILURE RECOVERY APPARATUS

CROSS-REFERENCE TO RELATED APPLICATION

This application claims the benefit and priority of Japanese Patent Application No. 2009-060766, filed Mar. 13, 2009. The foregoing application is incorporated by reference herein in its entirety.

BACKGROUND OF THE INVENTION

The present invention relates to techniques regarding a stream recovery method, a stream recovery program and a failure recovery apparatus.

A stream processing system is a data processing system having a function of processing stream data which is infinitely arriving time sequential data series. The stream processing system has a function of processing (selecting, projecting, coupling, aggregating, counting, etc) a large amount of stream data in real time on a memory. The stream processing system manages data necessary for real time processing on a memory. There is therefore a possibility of losing data developed on the memory when a failure occurs.

Roughly two failure recovery methods are incorporated when a failure occurs in a system which manages data on the memory. One method parallelizes a plurality of computers so as to increase redundancy and improve reliability to run another computer immediately after a failure occurs in one computer. The other method recovers a failure by making a single system have a failure recovery function.

An in-memory database is used in a system which develops data on a memory in order to improve performances, similar to the stream processing system. If the contents of the memory are extinguished, the database disappears. Snap shots of the contents of the database are acquired at every constant time periods, and thereafter a renewal journal is retained to recover a failure (refer to JP-A-2007-200114).

If the method of acquiring snap shots of the data on the memory like the prior art is applied to the stream processing system, it is considered that processing becomes slow because there are many inputs/outputs of data. The method of parallelizing stream processing systems causes high cost although reliability and usability are improved.

On the other hand, the stream processing system does not continue to hold a database on a memory as different from an in-memory database, but holds input data and edition data necessary for processing during a constant time period. If data is lost because of a failure of the stream processing system, the stream processing system can be recovered by a method of reentering stream data from an input stream backup of a constant time period necessary for processing.

With this method of reentering stream data from the input stream backup, however, all stream data stored in the input stream backup is required to be reentered because it cannot know what amount of and from which time the stream data should be reentered. This is inefficient in that stream data already processed is required to be processed again.

SUMMARY OF THE INVENTION

It is therefore a main object of the present invention to solve the above-described problems and realize efficient failure countermeasure of a stream processing system.

In order to settle the above-described issues, the present invention provides a stream recovery method for a stream processing system using a stream distribution apparatus for distributing stream data, a steam processing apparatus for performing a query process of the distributed stream data, and a failure recovery apparatus for performing control for reentering the stream data to be lost by failure occurrence at the stream processing apparatus into the stream processing apparatus, wherein:

the stream data is structured including data tuples as a query process target and a recovery point tuple for indicating a position of the data tuples in the stream data;

the stream processing apparatus performs the query process for the data tuples, excludes the recovery point duple from the query process and temporarily pools the recovery point tuple in a buffer, when in the stream processing apparatus the data tuple is instructed to be deleted, reads the recovery point tuple positioned before the data tuples as a deletion instruction target, and writes position information in the stream data indicated by the recovery point tuple in a storage; and the failure recovery apparatus reads position information in the stream data from the storage upon detection of a failure occurred in the stream processing apparatus, uses position information positioned lastly among the read position information, as a reenter position in the stream data, and instructs the stream distribution apparatus to reenter the stream data starting from the reenter position into the stream processing apparatus.

Other means will be described later.

According to the present invention, it is possible to provide efficient failure countermeasure for the stream processing system.

DESCRIPTION OF THE EMBODIMENT

An embodiment of the invention will be described with reference to the accompanying drawings.

Figure 1:
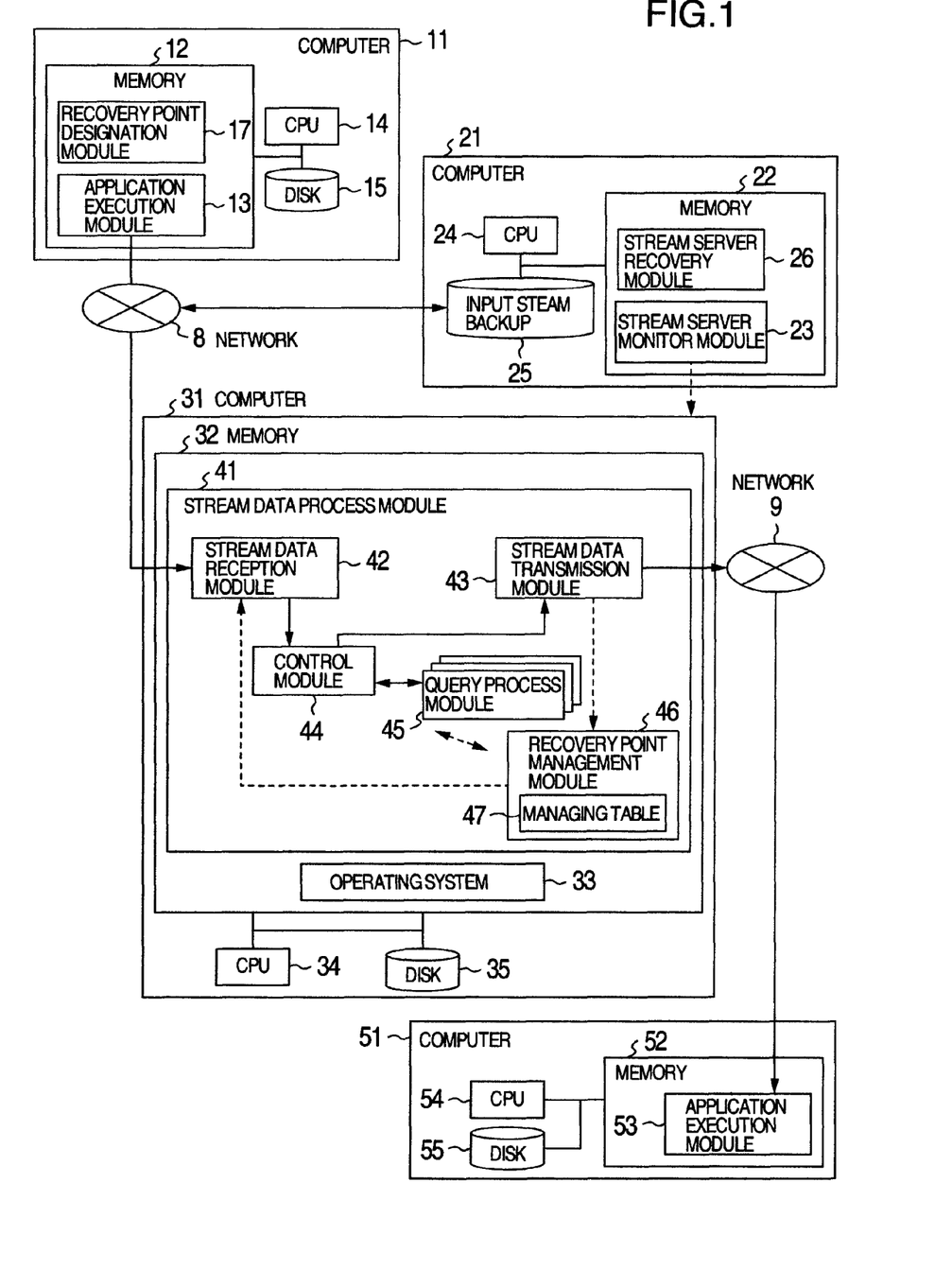
FIG. 1 illustrates the structure of a stream processing system according to an embodiment of the present invention.

FIG. 1 is a diagram illustrating the structure of a stream processing system. The stream processing system is structured including computers 11, 21, 31 and 51. A network 8 interconnects the computers 11, 21 and 31. A network 9 interconnects the computers 31 and 51. The computer 11 transmits stream data to the computer 31. The computer 21 backs up stream data transmitted from the computer 11, and performs a recovery process for stream data lost by a failure by using the backup. The computer 31 performs a query process for stream data transmitted from the computer 11, and transfers the stream data to the computer 51. The computer 51 receives stream data transmitted from the computer 31 and a query process result at the computer 31, and executes a business application by using the received stream data and query process result.

Figure 5:
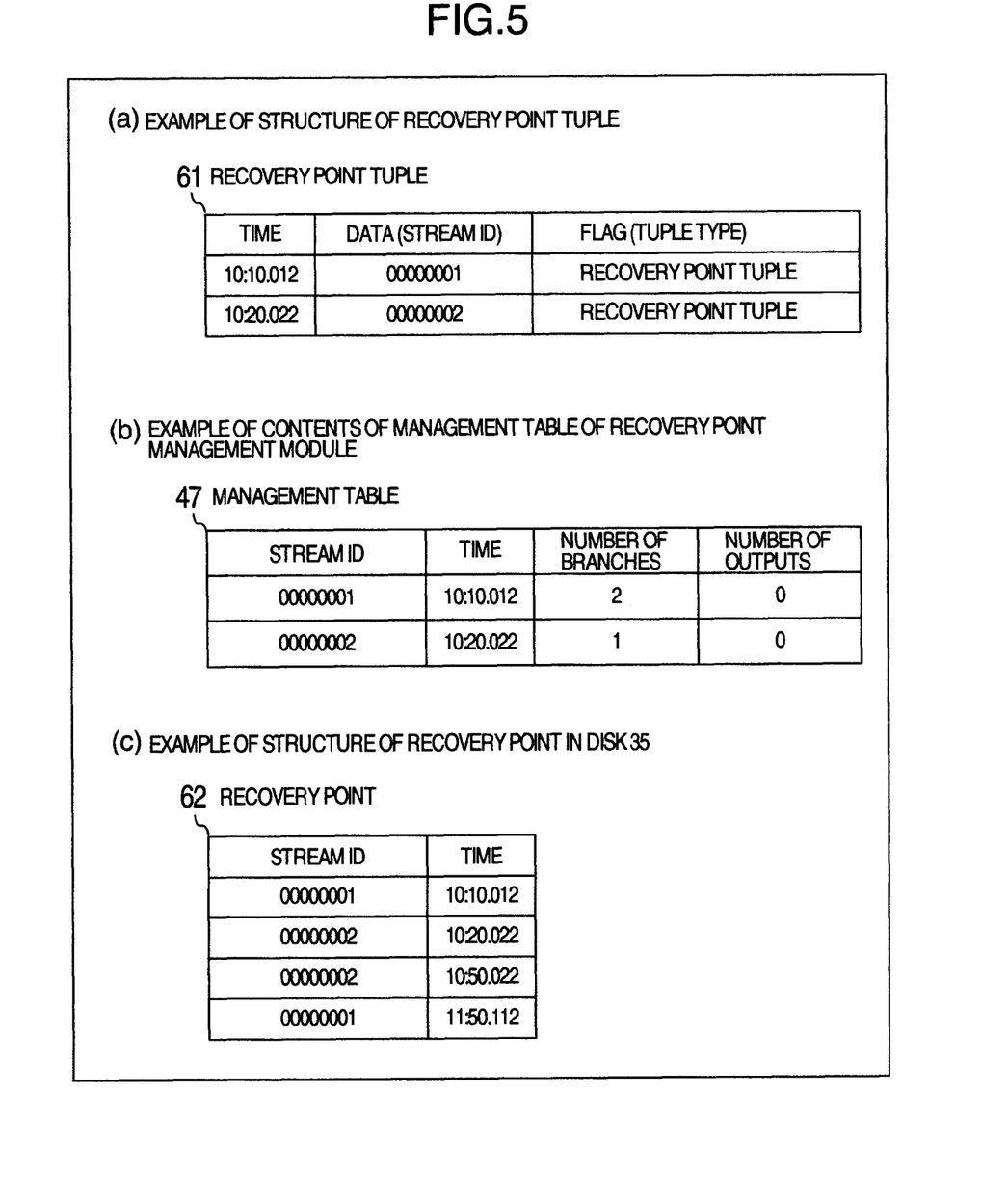
FIG. 5 is a diagram illustrating each data structure of the stream processing system of the embodiment.

The computer 11 has a memory 12, a CPU 14 and a disk 15. The memory 12 stores application execution module 13 for transmitting stream data and a recovery point designation module 17 for making the application execution module 13 designate an addition position of a recovery point tuple 61 (refer to FIG. 5(a) for the details).

The computer 21 has a memory 22, a CPU 24 and a input stream backup 25. The memory 22 stores a stream server monitor module 23 for monitoring the state of the stream server and a stream server recovery module 26 for executing a stream server recovery process. The input stream backup 25 may be constituted of a nonvolatile storage such as a flash memory.

The computer 31 has a memory 32, a CPU 34 and a disk 35. An operating system 33 runs on the memory 32, and a stream data process module 41 runs on the operating system 33. The stream data process module 41 has a stream data reception module 42, a stream data transmission module 43, a control module 44, a query process module 45 and a recovery point management module 46. The query process module 45 executes process contents described in a continuous query language (CQL) or the like for stream data.

The computer 51 has a memory 52, a CPU 54 and a disk 55. The memory 52 stores an application execution module for receiving data processed by the stream data process module 41.

In the stream processing system of FIG. 1 described above, the computer 21 reads stream data lost by a failure at the computer 31 from the input stream backup 25, and reenters the lost stream data. In this case, part of the stream data has been processed already in the time period before the occurrence of the failure at the computer 31. The computer 21 selects therefore stream data still not processed by the computer 31, and reenters the selected stream data. It is not necessary for the computer 31 to process the same data redundantly so that a failure recovery process efficiency can be improved more than that all stream data of the input stream backup 25 is reentered.

In order to realize a highly efficient reentering process, it is necessary to provide a key to selecting a position of stream data to be reentered among stream data in the input stream backup 25. In this embodiment, a recovery point tuple 61 is used as the key. Since the recovery point tuple 61 is one type of tuples constituting stream data, the recovery point tuple 61 is transmitted together with the data tuples of stream data. The recovery point tuple 61 is not, however, associated with the contents of stream data, but it is a failure recovery control tuple and does not concern about calculations of the query process module 45. It follows all branches without any skip.

In this embodiment, a process of adding the recovery point tuple 61 to stream data includes two modes. In one mode (refer to FIG. 2), a stream data reception side (the stream data reception module 42 of the computer 31) adds the recovery point tuple. In the other mode (refer to FIG. 3), a stream data transmission side (the recovery point designation module 17 of the computer 11) adds the recovery point tuple. These two modes will be described.

Figure 2:
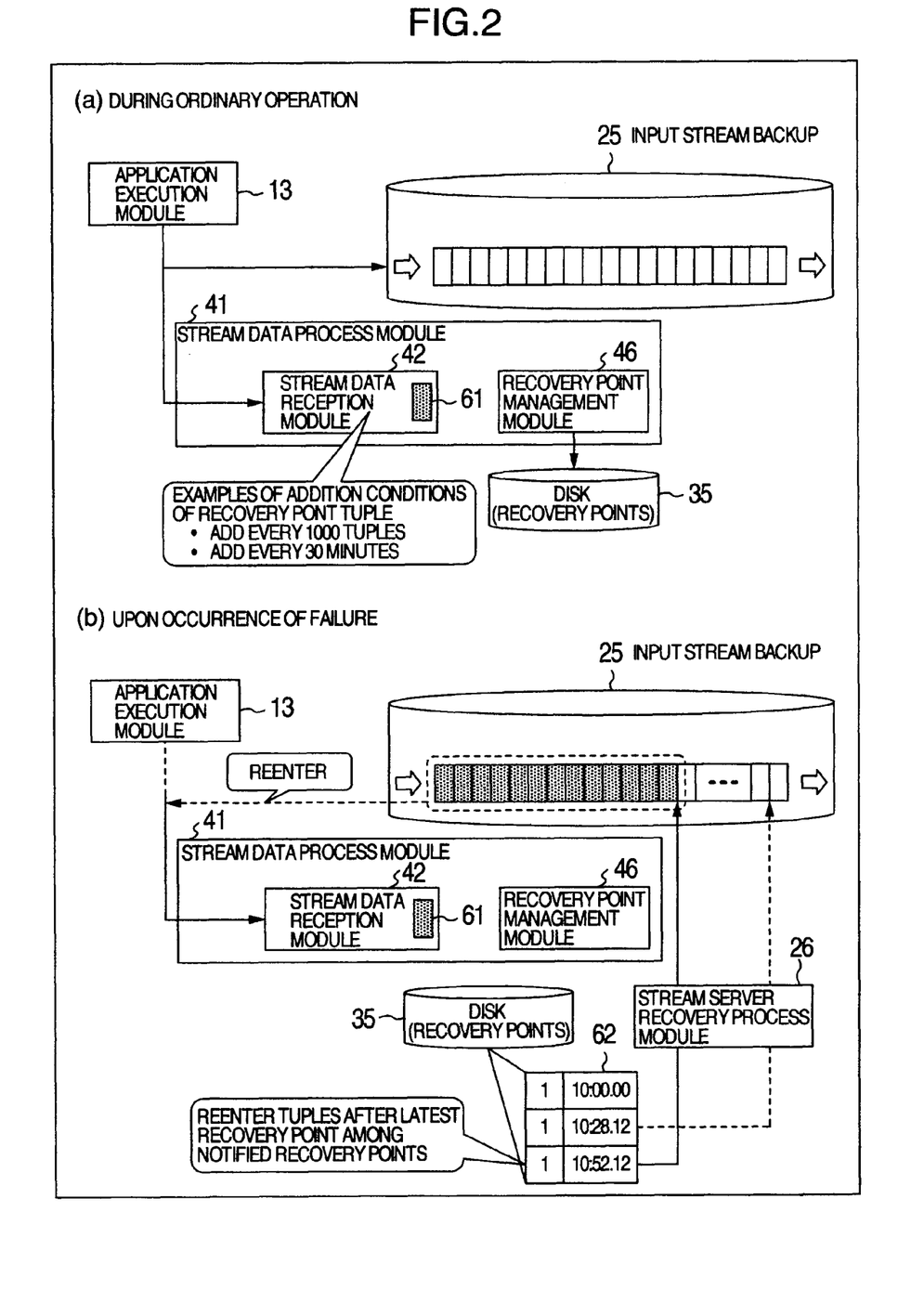
FIG. 2 is a diagram illustrating a process of adding a recovery point tuple 61 on a stream data reception side of the embodiment.

FIG. 2 is a diagram illustrating the mode of adding the recovery point tuple 61 on the stream data reception side. In this embodiment, for the notation of stream data existing in the input stream backup 25 and the like, each tuple (data tuple, recovery point tuple 61 and the like) is represented by a rectangle, old data is placed right whereas new data is placed right (refer to arrows in the drawings).

FIG. 2(a) first illustrates an addition process of the recovery point 61 during ordinary operation.

The stream data reception module 42 adds the recovery pointer tuple 61 to the stream data transmitted by the application execution module 13, if a condition of adding the recovery point tuple 61 is satisfied. The addition condition may be "add every 1000 tuples", "add every 30 minutes" and the like.

The recovery point management module 46 uses as a recovery point (refer FIG. 5(c) for the details thereof) the time when the recovery point tuple 61 is output from the stream data process module 41, and outputs the recovery point 62 as a nonvolatile file in the disk 35. Namely, the recovery point 62 indicates a position of stream data to be reentered among the stream data in the input stream backup 25.

FIG. 2(b) then illustrates a process of using the recovery point tuple 61 upon occurrence of a failure.

Upon detection of stream processing system down, the stream server recovery process module 26 reads the latest recovery point 62 (e.g., "10:52.12") from the disk 35.

Then, the stream server recovery module 26 searches a tuple of the input stream backup 25 corresponding to the latest recovery point 62, and reenters the tuples newer than the tuple (reenter point) found as the search result, into the stream data process module 41. A failure recovery becomes possible in this manner.

If the number of tuples is designated as the condition of adding the recovery point tuple 61, the number of tuples to be used for system recovery can be calculated so that a system recovery time can also be estimated.

If the time is designated as the condition of adding the recovery point tuple 61, the system can be recovered up to the designated time. This is advantageous in that the recovery point can be determined without calculating the number of input tuples and the like, in the case wherein there is data for log analysis, voice analysis or the like to be entered into the system, i.e., the case wherein data is not analyzed in real time.

Figure 3:
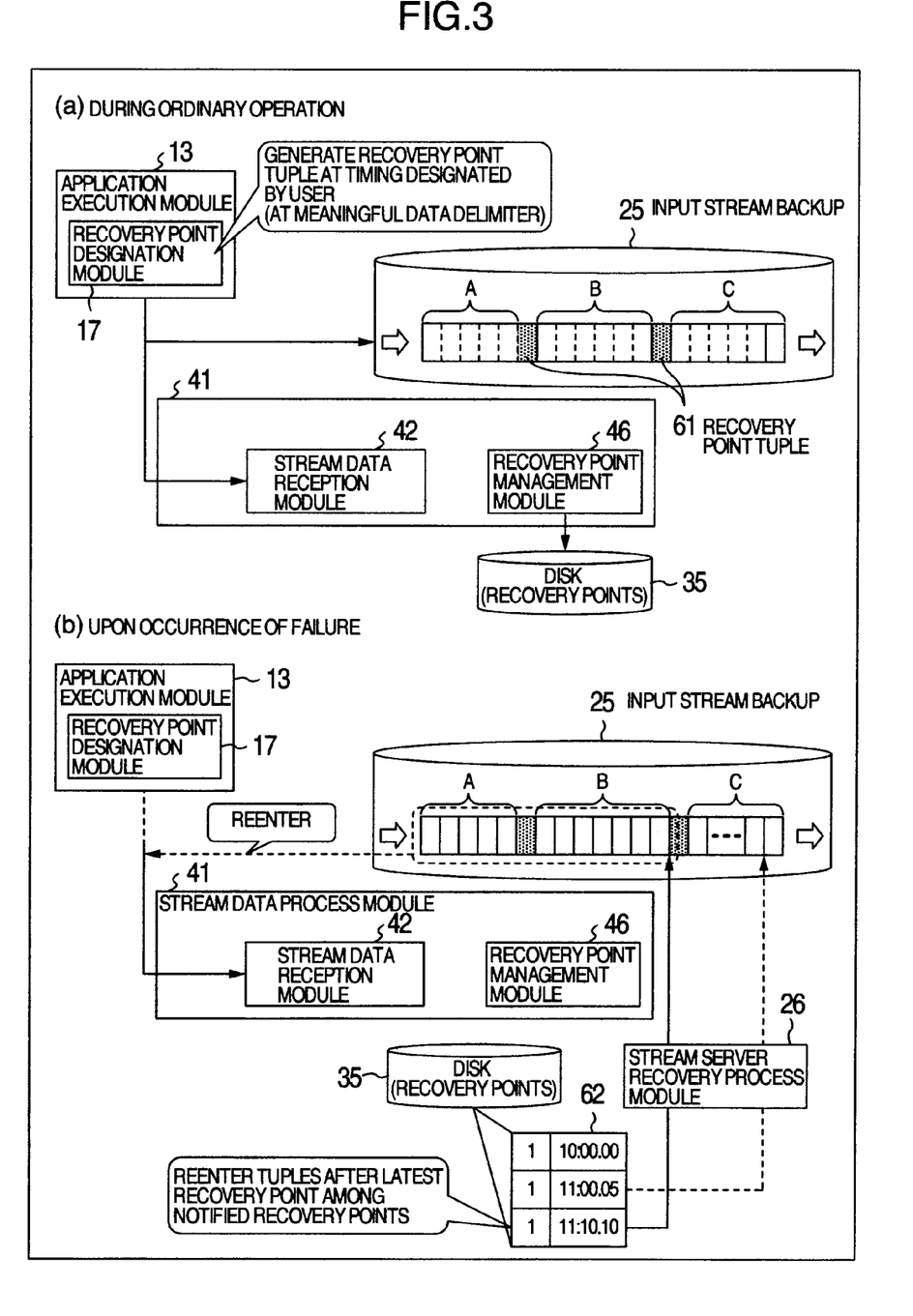
FIG. 3 is a diagram illustrating a process of adding the recovery point tuple 61 on a stream date transmission side of the embodiment.

FIG. 3 is a diagram illustrating the mode of adding the recovery point tuple 61 on the stream data transmission side.

FIG. 3(a) first illustrates an addition process of the recovery point 61 during ordinary operation. A difference from FIG. 2(a) resides in that the main object of the addition process of the recovery point tuple 61 is changed from the stream data reception module 42 of the computer 31 to the recovery point designation module 17 of the computer 11.

The mode of adding the recovery point tuple 61 on the stream data transmission side is effective particularly when sense information on a data tuple constituting stream data is reflected upon an addition position of the recovery point tuple 61.

For example, in FIG. 3(a) data tuples constituting each stream data are classified into three tuple groups (A, B, C). The application execution module 13 receives an input of sense information on a data tuple (information necessary for generating a tuple group) from a user. When the recovery point designation module 17 is called, the application execution module 13 notifies also the sense information of the data tuple to the recovery point designation module 17. By referring to the sense information on the data tuple, the recovery point designation module 17 inserts the recovery point tuple 61 at the delimiter position of the tuple group. It is therefore possible to set the recovery point 62 at the position intended by a user.

The sense information on a data tuple may be grammatical information (paragraph unit, sentence unit, segment unit, etc) of character string stream data, program information (program unit, scene unit, etc) of radio, television broadcast stream data, structure information (company unit of investment information, etc) of numerical analysis stream data, and the like.

FIG. 3(b) then illustrates a process of using the recovery point tuple 61 upon occurrence of a failure. FIG. 3(b) is similar to FIG. 2(b). For example, the time (11:10.10) of the recovery point 62 when the recovery point tuple 61 between the tuple groups B and C is notified is the latest recovery point 62, the stream server recovery process module 26 uses the tuples (tuple groups B and A) after the tuple point 62 as the reenter target.

Figure 4:
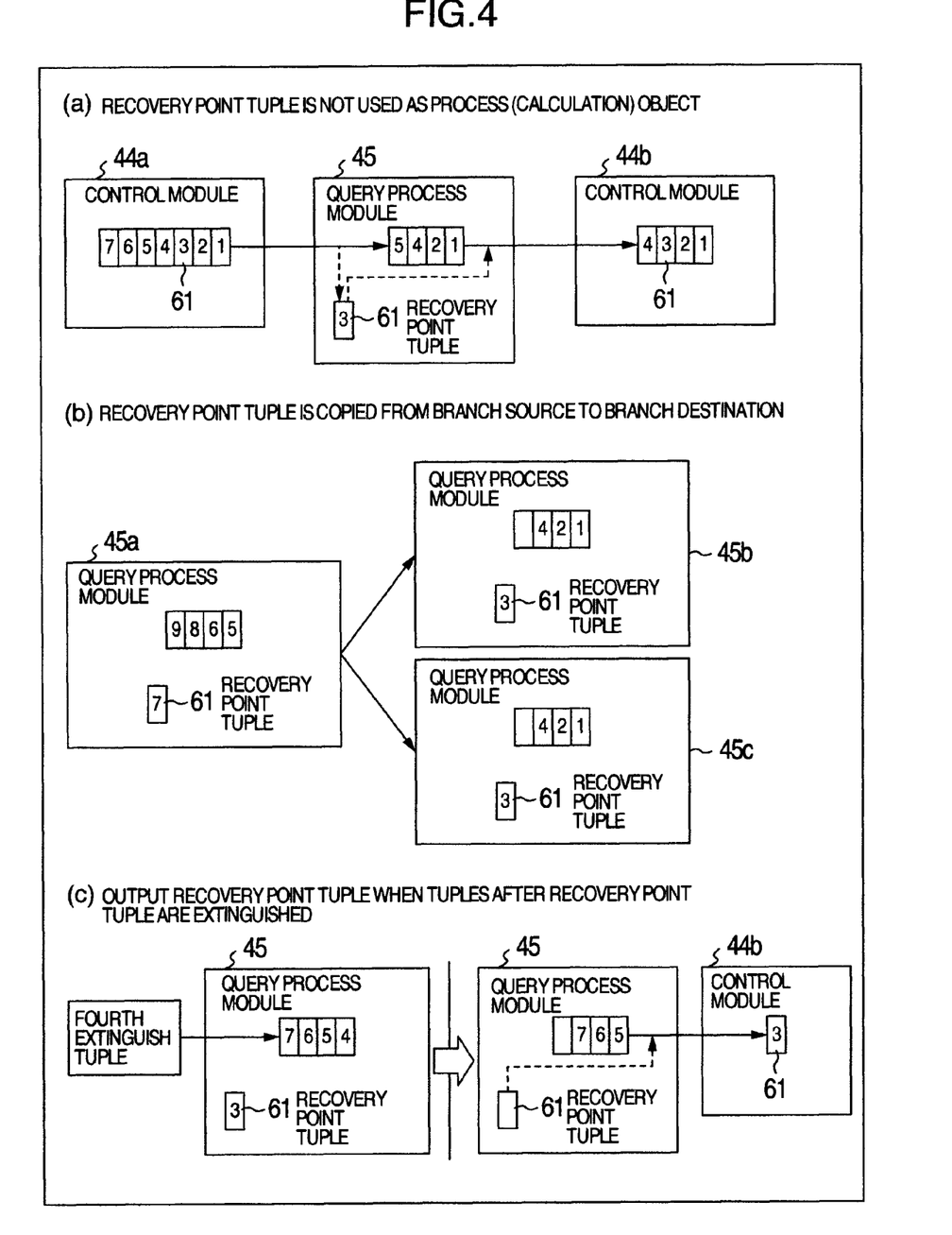
FIG. 4 is a diagram illustrating a process of processing the recovery point tuple 61 at a query process module 45 of the embodiment.

FIG. 4 is a diagram illustrating a process sequence of the query process module 45 for the recovery point tuple 61.

In FIG. 4(a), the query process module 45 uses the data tuples (other than the third tuple) of stream data as the query calculation object, and excludes the recovery point tuple 61 (third tuple) of the data stream from the query calculation object. The query process module 45 temporarily loads the input recovery point tuple 61 in a buffer (queue or the like) until it is output as illustrated in FIG. 4(c).

FIG. 4(b) illustrates a branch from a query process module 45a to query process modules 45b and 45c. If a destination of a recovery point tuple 61 (seventh tuple) is branched, the query process module 45a copies the recovery point tuple 61 to each branch destination. The branched query process modules 45b and 45c exclude the recovery point tuple 61 (third tuple) output from the query process module 45a from the query calculation object.

FIG. 4(c) illustrates an output process of the query process module 45 for the recovery point tuple 61. When an extinction tuple for a data tuple is input (when an extinguish instruction for the fourth tuple is indicated), the query process module 45 outputs the recovery point tuple 61 (e.g., third tuple) before the extinction tuple to the control module 44b.

Namely, a control instruction for extinguishing tuples whose life time in the query process module 45 expired, from the query process module 45, is written in the extinction tuple to be issued by the control module 44. The control module 44 issues the extinction tuple for extinguishing an unnecessary data tuple for the query calculation process.

In this manner, when the third recovery point tuple 61 is output, the query process module 45 can judge that first and second data tuples existing before the third recovery point tuple 61 are both output from the query process module 45.

FIG. 5(a) is a diagram illustrating the structure of the recovery point tuple 61. One row (one record) in the table shown in FIG. 5(a) indicates one recovery point tuple 61. The recovery point tuple 61 is structured in correspondence with a time, data (stream ID) and a flag (tuple type).

The "time" of the recovery point tuple 61 is data for identifying the position of a data tuple in the stream data, and may be a time added upon generation (in the case wherein distribution time can be identified in live relay), a relative time in the stream data (a reproduction time of an already recorded program) or the like. If the position of a data tuple in the stream data is not identified uniquely only by the time information, a combination of time information and another piece of identification information may be used as position identifying information of a data tuple.

The "data (stream ID)" of the recovery point tuple 61 indicates that a stream ID is loaded in a data storage column of a data tuple. The stream ID is a unique ID assigned to each input stream. The data (stream ID)" is not rewritten because it is not the query calculation object.

The "flag (tuple type)" of the recovery point tuple 61 indicates that the tuple type is not a data tuple but the recovery point tuple 61 for control.

FIG. 5(b) is a diagram illustrating the management table 47. The management table 47 manages one recovery point tuple 61 by using one row (one record). The management table 47 manages the recovery point tuple in correspondence with a stream ID, a time, the number of branches and the number of outputs.

The "stream ID" and "time" of the management table 47 are identification information for the recovery point tuple 61 as described with FIG. 5(a), and are registered when the recovery point tuple 61 is generated.

The "number of branches" of the management table 47 indicates the number of branch process execution frequencies. Upon reception of a branch notice notified each time the query process module 45 issues a branch, the number of branches is incremented by "1" starting from an initial value "1".

The "number of outputs" of the management table is incremented by "1" each time the stream data transmission module 43 outputs the recovery point tuple 61 corresponding to this record. The record having the same number of the number of branches" and "the number of outputs" of the management table 47 is deleted from the management table 47 and written as the recovery point 62 in the disk 35.

FIG. 5(c) is a diagram illustrating the structure of the recovery point 62 to be stored n the disk 35. The recovery point 62 has a unique ID assigned to each input stream and a time added upon generation of the recovery point tuple. The recovery point 62 is output from the recovery point management module 46 to the disk 35 in accordance with the management table 47.

The recovery point 62 is referenced upon occurrence of a failure. Namely, as described with FIG. 2(b) and the like, it is necessary to identify the reenter position of of the stream data when a failure occurs. The stream is searched from the recovery point by using the stream ID, and the latest time among times corresponding to the stream ID is referenced as identification information on the reenter position of the stream data.

Figure 6:
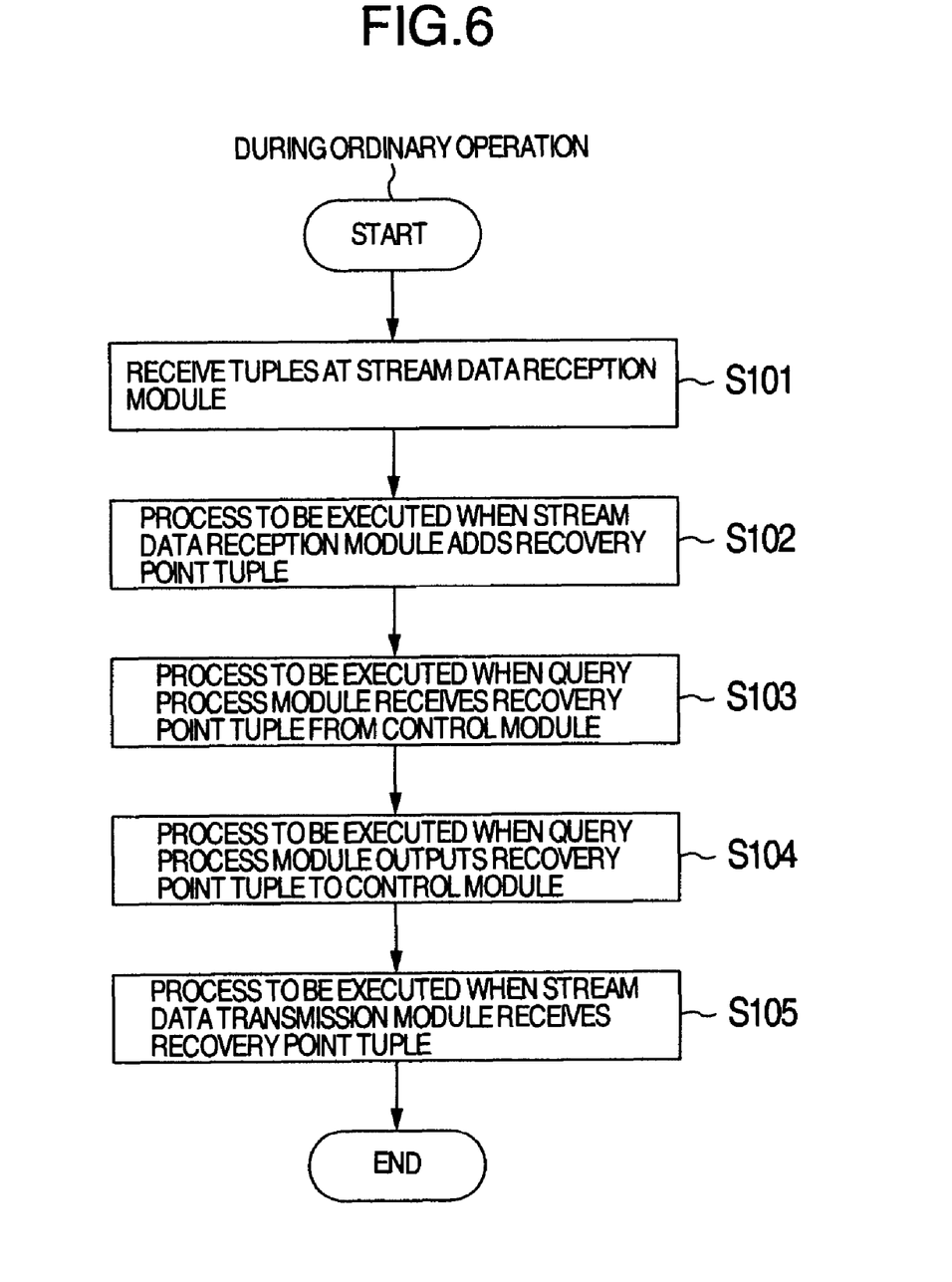
FIG. 6 is a flow chart illustrating a process of generating and extinguishing the recovery point tuple 61 during ordinary operation to be executed by a stream data process module 41 of the embodiment.
Figure 7:
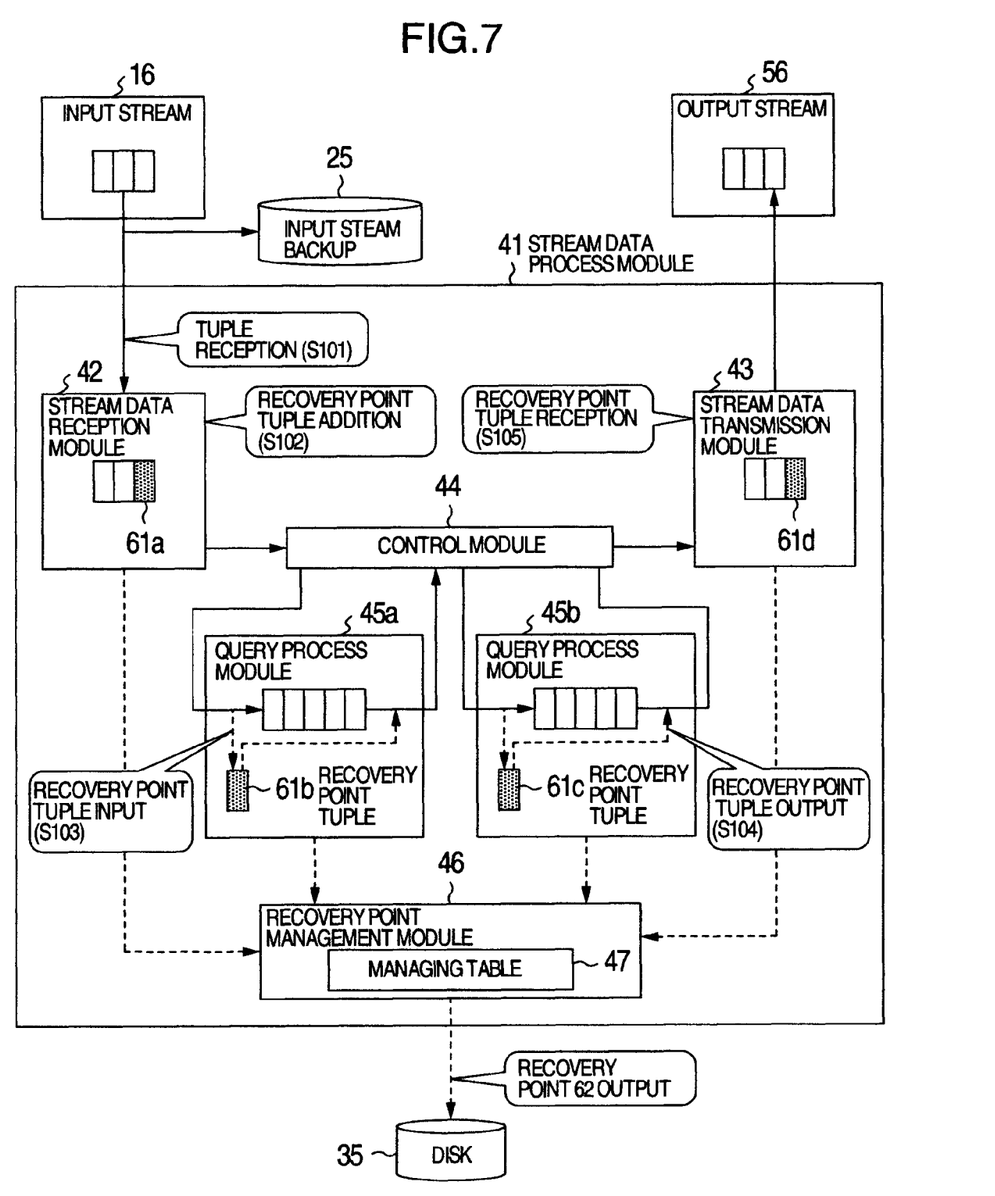
FIG. 7 is a diagram illustrating a process of the flow chart in FIG. 6 of the embodiment.

FIG. 6 is a flow chart illustrating an operation of the stream data process module 41 from generation to extinction of the recovery point tuple 61. FIG. 7 is a diagram illustrating the process by the flow chart. With reference to FIGS. 6 and 7, an ordinary operation of the stream data process module 41 will be described.

The stream data reception module receives tuples (data tuples, recovery point tuples 61, etc) of an input stream 16 from the computer 11 (S101). In this mode illustrated in FIG. 7, the input stream 16 is backed up in the input stream backup 25 and input to the stream data process module 41. This mode is suitable for live broadcasting for generating the input stream 16 in real time. A mode (on-demand distribution) may be used wherein an input stream already accumulated in the input stream backup 25 is input to the stream data process module 41.

The stream data reception module 42 adds (inserts) a recovery point tuple 61 (61a) between data tuples of the input stream 61 (61a) (S102). A position at which the recovery point tuple 61 is added is, for example, a position satisfying a predetermined addition condition. Upon reception of an addition notice of the recovery point tuple 61 from the stream data reception module 42, the contents of the notice are newly registered in the management table 47.

The stream data reception module 42 outputs the recovery point tuple 61 to the control module 44.

The query process modules 45a and 45b receive the recovery point tuple 61 from the control module 44 (S103). As illustrated in FIG. 4(a), the query management modules 45a and 45b do not use recovery point tuples 61b and 61c as the query calculation object, but pool the tuples in a buffer.

As illustrated in FIG. 4(c), upon reception of an extinction tuple, the query process module 45 outputs the recovery point tuple 61 to the control module 44 (S104). Upon reception of a notice that the recovery point tuple 61 was output from the query process modules 45a and 45b, the recovery point management module 46 updates the information on the management table 47.

The stream data transmission module 43 receives the recovery point tuple 61 output from the control module, notifies this to the recovery point management module 46, and thereafter deletes the recovery point tuple 61 (S105). Upon reception of the notice from the stream data transmission module 43, the recovery point management module 46 increments the "number of outputs" of the management table 47 by "1". If the "number of branches" and the "number of outputs" of the management table become equal, the recovery point management module 46 judges that data before a recovery point tuple 61d in the input stream backup 25 is output from the stream data, and outputs the recovery point 62 to the disk 35.

In this manner, information on the recovery point tuple 61 deleted at S105 is added to the recovery point 62. Data tuples at a time before the time represented by the latest recovery point 62 are excluded from the reenter object. Data tuples not as the reenter object are deleted from the input stream backup 25 so that an empty capacity of a memory for storing the input stream backup 25 can be increased.

Figure 8:
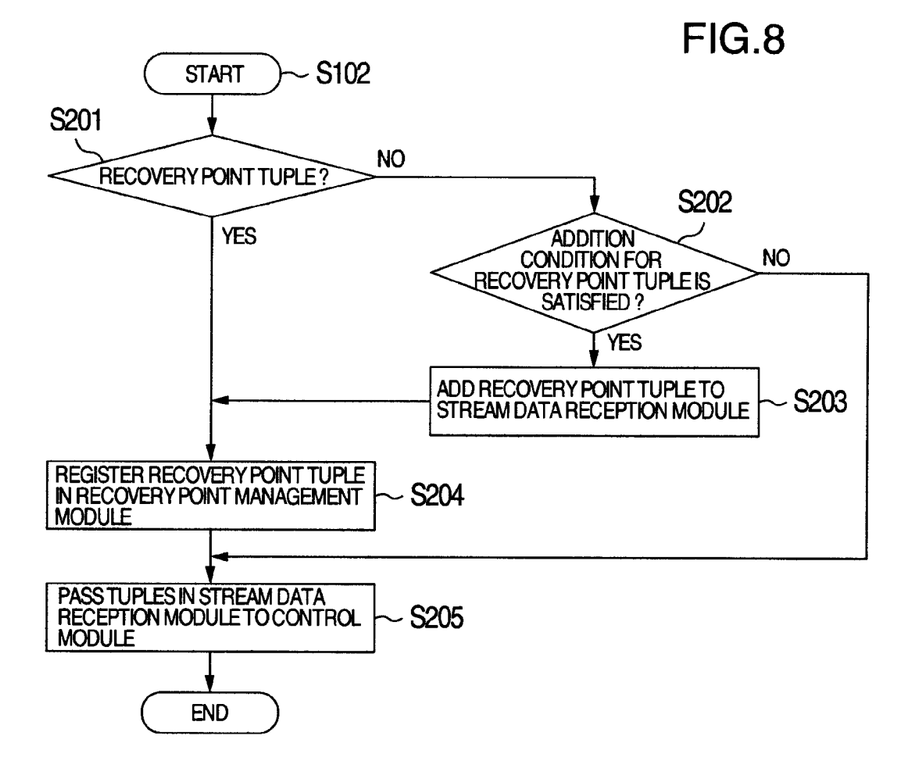
FIG. 8 is a flow chart illustrating the details of S102 (an addition process for the recovery point tuple 61) to be executed by the stream data processing module 41 of the embodiment.

FIG. 8 is a flow chart illustrating the details of S102 (an addition operation of the recovery point tuple 61) to be executed by the stream data process module 41.

It is judged at S201 whether the input tuple of the input stream 16 is the recovery point tuple 61. The case wherein the recovery point tuple 61 is included in the input stream is the case wherein a user on a transmission side explicitly sets the recovery point tuple 61 as described with FIG. 3(a).

If it is set in such a manner that the recovery point tuple 61 designated by a user on the transmission side is to be neglected on the reception side, the input recovery point tuple 61 may be deleted and the process at S201 is executed for the next tuple.

If YES at S201, the flow advances to S204, whereas if NO at S201, the flow advances to S202.

It is judged at S202 whether the addition condition (refer to FIG. 10 for the details thereof) for the recovery point tuple 61 is satisfied. If YES at S202, the flow advances to S203, whereas if NO at S202, the flow advances to S205.

The recovery point tuple 61 is generated and added to the stream data reception module 42 at S203.

Information (record) on the recovery point tuple 61 is added to the management table 47 of the recovery point management module 46 at S204. Tuples in the stream data reception module 42 are output to the control module 44.

Figure 9:
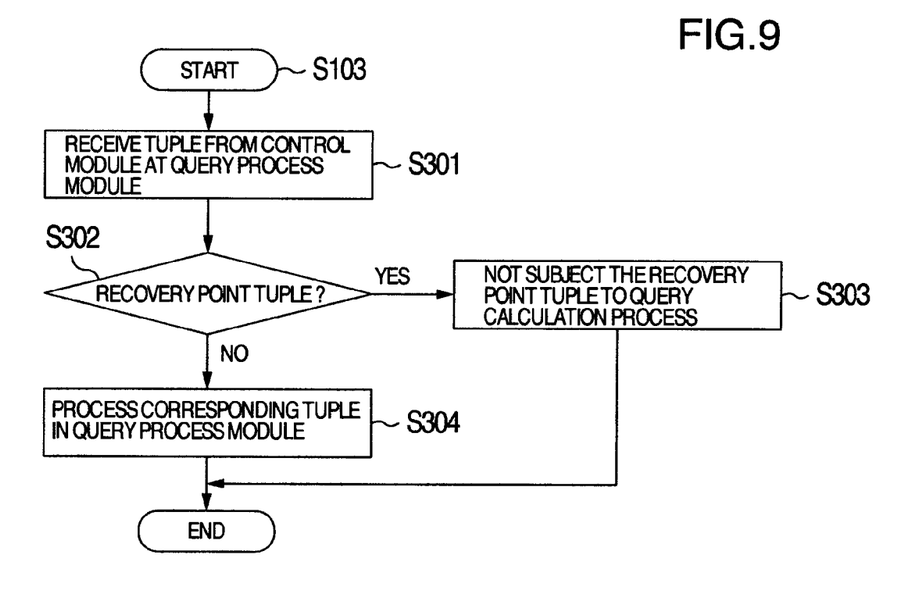
FIG. 9 is a flow chart illustrating the details of S103 (a reception process for the recovery point tuple 61) to be executed by a query process module 45 of the embodiment.

FIG. 9 is a flow chart illustrating the details of S103 (a reception process for the recovery point tuple 61) to be executed by the query process module 45.

At S301 a tuple is received from the control module 44.

At S302 it is judged whether the received tuple is the recovery point tuple 61.

If YES at S302, the flow advances to S303, whereas if NO at S302, the flow advances to S304.

At S303 the received recovery point tuple 61 is not subjected to the query calculation process, but pooled in a buffer.

At S304 the query calculation process is executed for the received data tuple.

Figure 10:
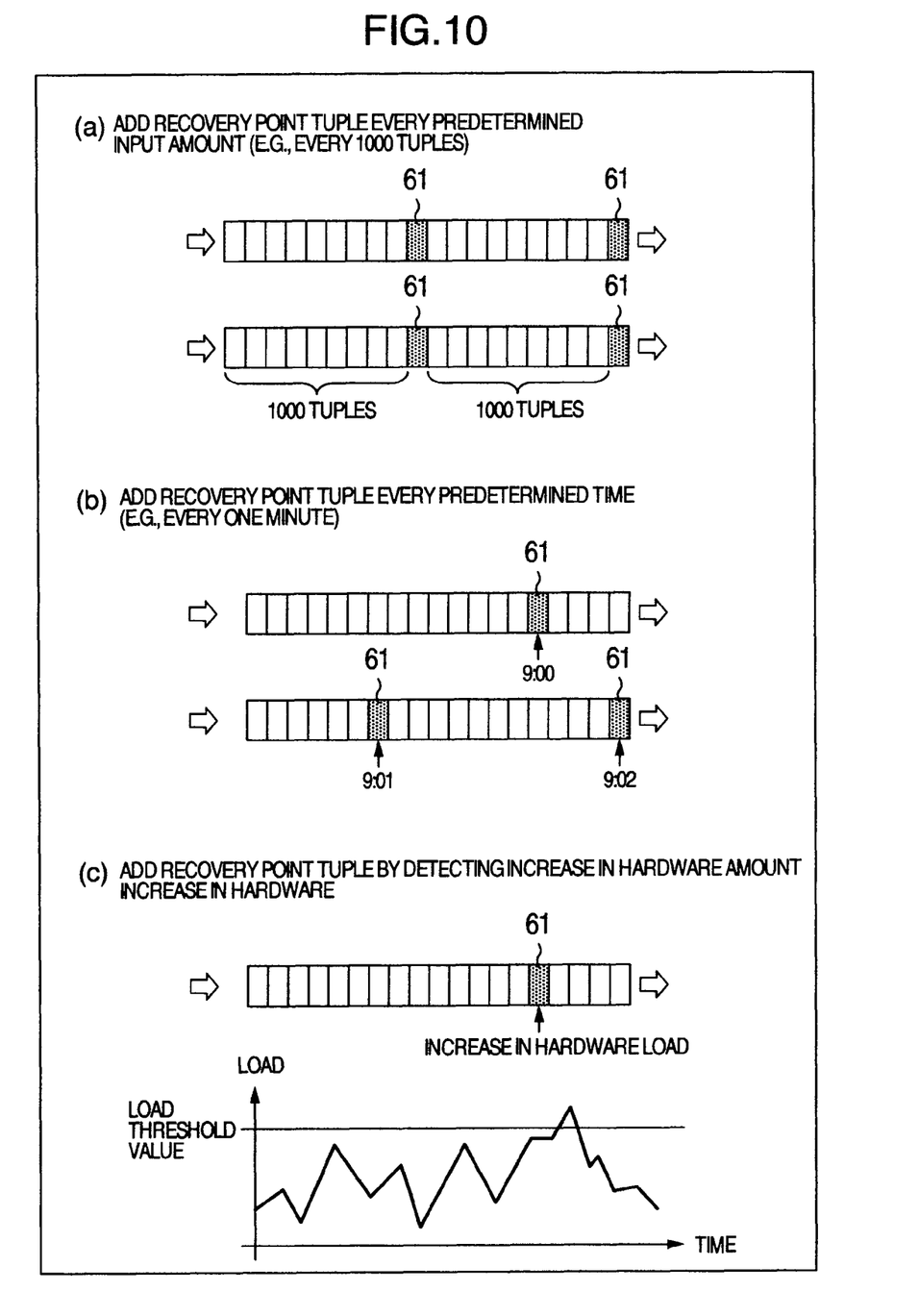
FIG. 10 is a diagram illustrating an example of an addition condition for the recovery point tuple 61 at S202 of the embodiment.

FIG. 10 is a diagram illustrating an example of the addition condition for the recovery point tuple 61 at S202.

FIG. 10(a) illustrates a condition of adding the recovery point tuple 61 every predetermined input stream amount. Since the recovery point is set every predetermined input stream amount, an input stream amount to be reentered at a failure can be calculated easily. Since the reenter amount can be calculated easily, a time to recovery can also be estimated.

FIG. 10(b) illustrates a condition of adding the recovery point tuple 61 every predetermined period. A recovery time can therefore be designated. If input data for log analysis, voice analysis or the like can be prepared in advance and an input amount of data does not change with time, the recovery point can be acquired at each designated time. It is therefore possible to make constant a recovery time of the stream processing system.

FIG. 10(c) illustrates a condition of adding the recovery point tuple 61 by detecting an external factor such as an increase in a hardware load. The external factor may be a "high" or "low" load of hardware (CPU, memory, I/O).

The addition conditions illustrated in FIGS. 10(a) to 10(c) may be used singularly or in combination. These addition conditions may use the same setting irrespective of time lapse, or a plurality of settings may be switched in accordance with a time zone or an event occurrence.

Figure 11:
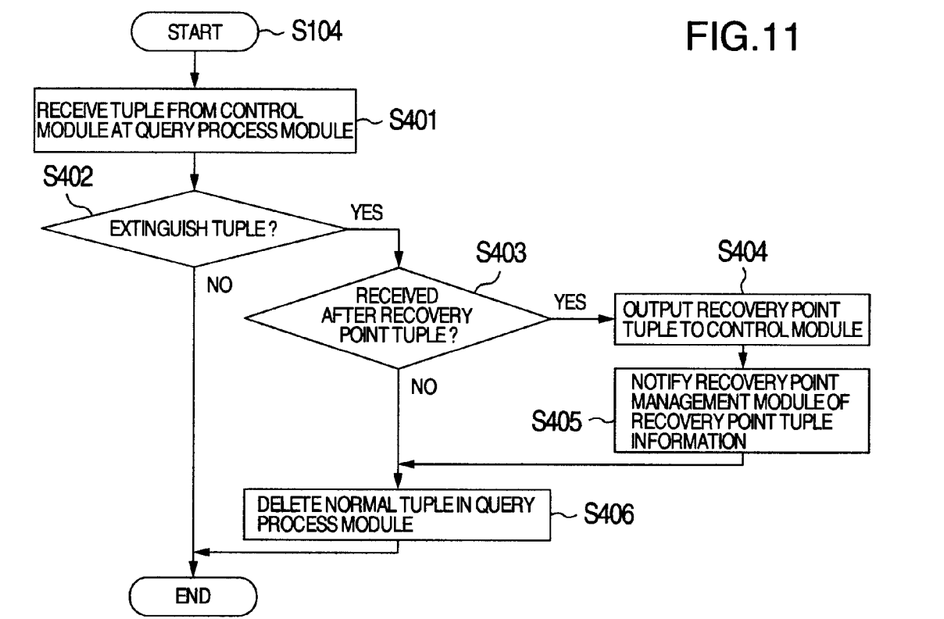
FIG. 11 is a flow chart illustrating the details of S104 (an output process for the recovery point tuple 61) to be executed by the query process module 45 of the embodiment.

FIG. 11 is a flow chart illustrating the details of S104 (an output process for the recovery point tuple 61) to be executed by the query process module 45.

At S401 a tuple is received from the control module 44.

At S402 it is judged whether the received tuple is an extinction tuple. The control module 44 generates the extinction tuple describing an instruction to extinguish the tuple whose life time in the query process module 45 has expired, and notifies the query process module 45 properly. If YES at S402, the flow advances to S403, whereas if NO at S402, the flow is terminated.

At S403 it is judged whether the data tuple instructed to be extinguished by the extinction tuple is the data tuple received after the recovery point tuple 61 pooled at S303. If YES at S403, the flow advances to S403, whereas if NO at S403, the flow advances to S406.

At S404 the recovery point tuple 61 pooled at S303 is output to the control module 44.

At S405 the recovery point management module 46 is notified of information such as the number of branches of the recovery point tuple 61 to be output.

In accordance with the notified number of branches, the recovery point management module 46 updates the "number of branches" of the record of the recovery table 47 designated by the output recovery point tuple.

At S406 in accordance with an instruction of the received extinction tuple, the data tuple (normal tuple) is deleted from the query process module 45.

Figure 12:
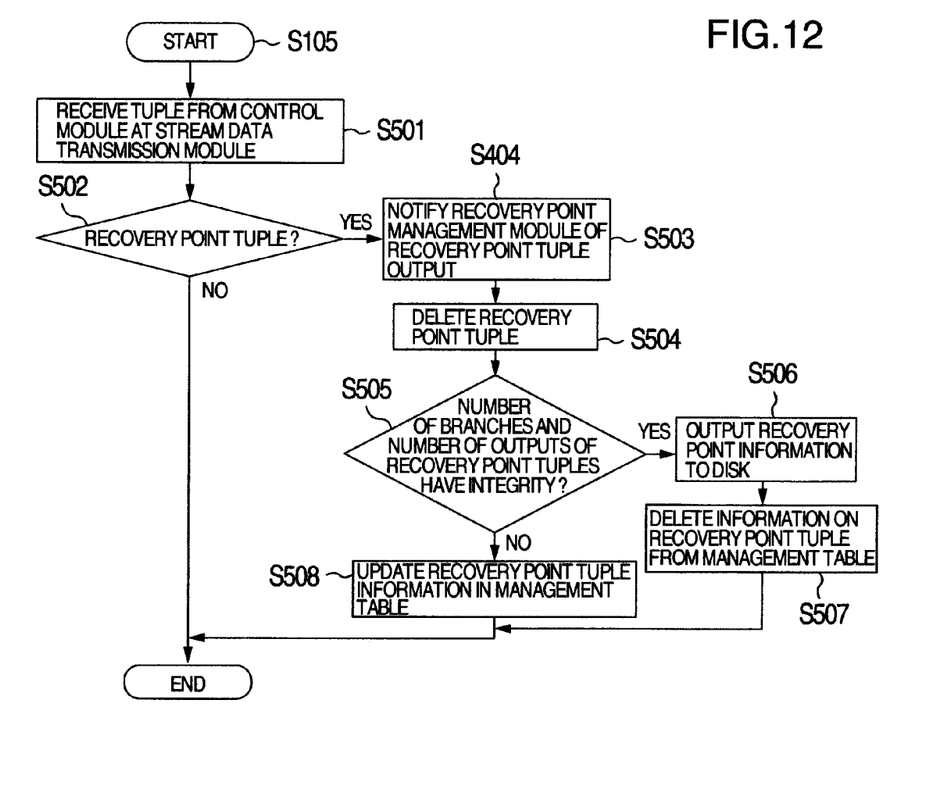
FIG. 12 is a flow chart illustrating the details of S105 (a delete process for the recovery point tuple 61) to be executed by a stream data transmission module 43 of the embodiment.

FIG. 12 is a flow chart illustrating the details of S105 (a process of deleting the recovery point tuple 61) to be executed by the stream data transmission module 43.

At S501 a tuple is received from the control module 44.

At S502 it is judged whether the received tuple is the recovery point tuple. If YES at S502, the flow advances to S503, whereas if NO at S502, the process is terminated.

At S503 the recovery point management module 46 is notified of information that the recovery point tuple 61 was output.

At S504 the received recovery point tuple 61 is deleted.

At S505 it is judged whether the "number of branches" and the "number of outputs" in the management table 47 of the received recovery point tuples have integrity. At this judgment process, integrity is judged if the output side collects all recovery point tuples as a predetermined recovery point tuple increases its number sequentially by branches. There is a possibility that the number of recovery point tuples 61 increases or decreases by a branch process and the like. It is therefore necessary to judge integrity of whether the correct number of increased or decreased recovery point tuples 61 is output when each recovery point tuple is output. For the recovery point tuple 61 without any branch, the number of branches and the number of outputs of the recovery point tuple 61 are both "1" providing integrity. If YES at S505, the flow advances to S506, whereas if NO at S505, the flow advances to S508.

At S506 information on the recovery point tuple 61 to be written in the recovery point 62 is output to the disk 35.

At S507 the recovery point management module 46 deletes the information on the recovery point tuple 61 output at S506 from the management table 47.

Figure 13:
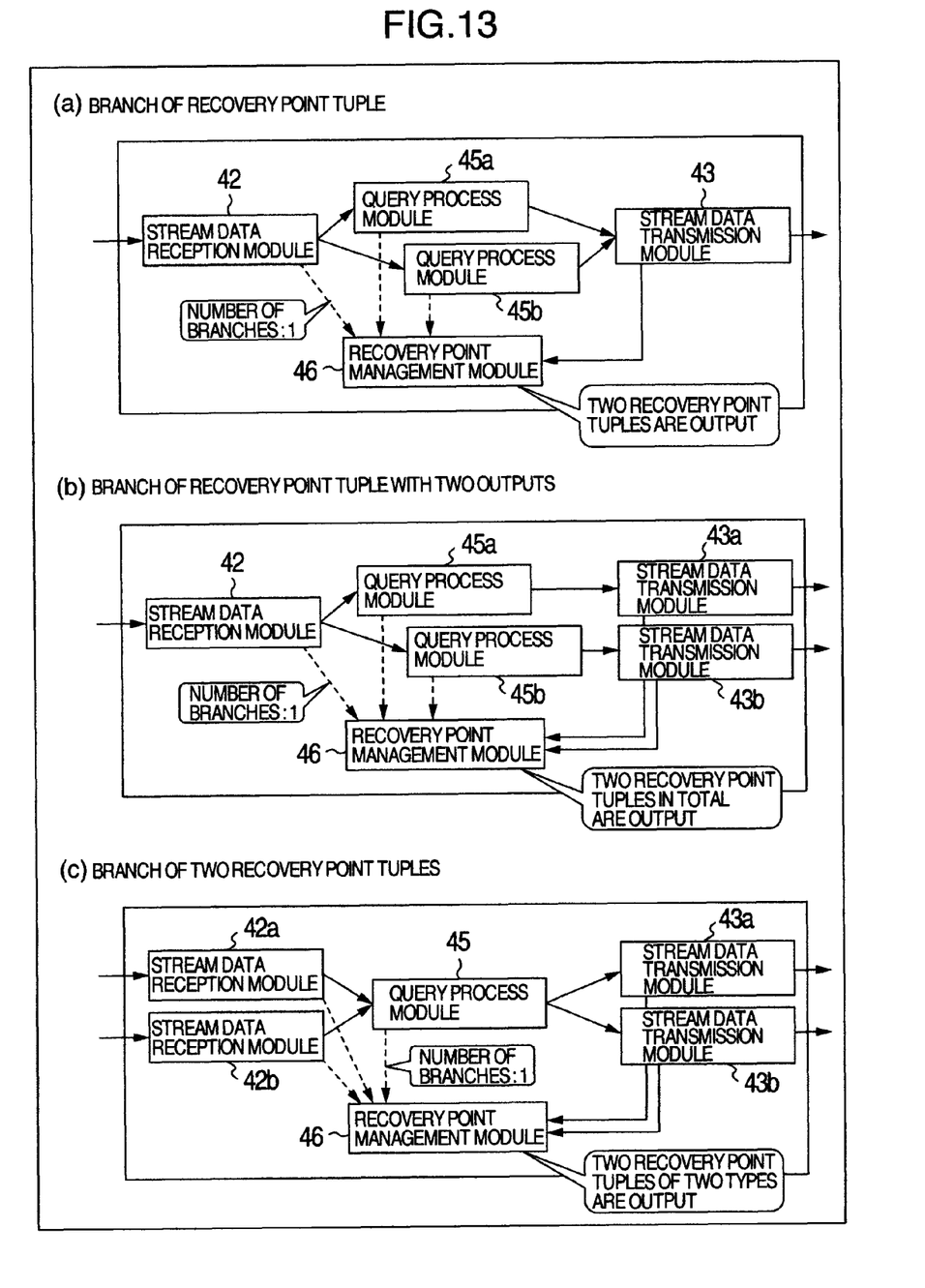
FIG. 13 is a diagram illustrating an example of an integrity judgment process of S505 of the embodiment.

At S508 the item of the number of outputs in the management table 47 of the recovery point management module 46 is updated by incrementing it by FIG. 13 illustrates an example of the integrity judgment process at S505.

In FIG. 13(a), one input recovery point tuple 61 is branched once at the query process module 45, and two recovery point tuples 61 are output. In this case, since two recovery point tuples 61 are output from one stream data transmission module 43, the "number of branches=2" and the "number of outputs=2" in the management table 47 have integrity.

In FIG. 13(b), one input recovery point tuple 61 is branched once at the query process module 45, and two recovery point tuples 61 are output. In this case, since one recovery point tuple 61 is output from each of two stream data transmission modules 43, the "number of branches=2" and the "number of outputs=2" in the management table 47 have integrity.

In FIG. 13(c), two input recovery point tuples 61 (unique Ids are different) are branched once at the query process module 45, and four recovery point tuples 61 are output. In this case, integrity judgment is performed for each unique ID (i.e., twice). Namely, since two recovery point tuples 61 are output from each of two stream data transmission modules 43, the "number of branches=2" and the "number of outputs=2" in the management table 47 for the first recovery point tuple have integrity, and the "number of branches=2" and the "number of outputs=2" in the management table 47 for the second recovery point tuple have integrity.

If many types of the recovery point tuple exist as in the case of FIG. 3(c), the latest recovery point 62 of each recovery point tuple 61 is extracted, and the oldest recovery point 62 is adopted as a reenter time point.

Figure 14:
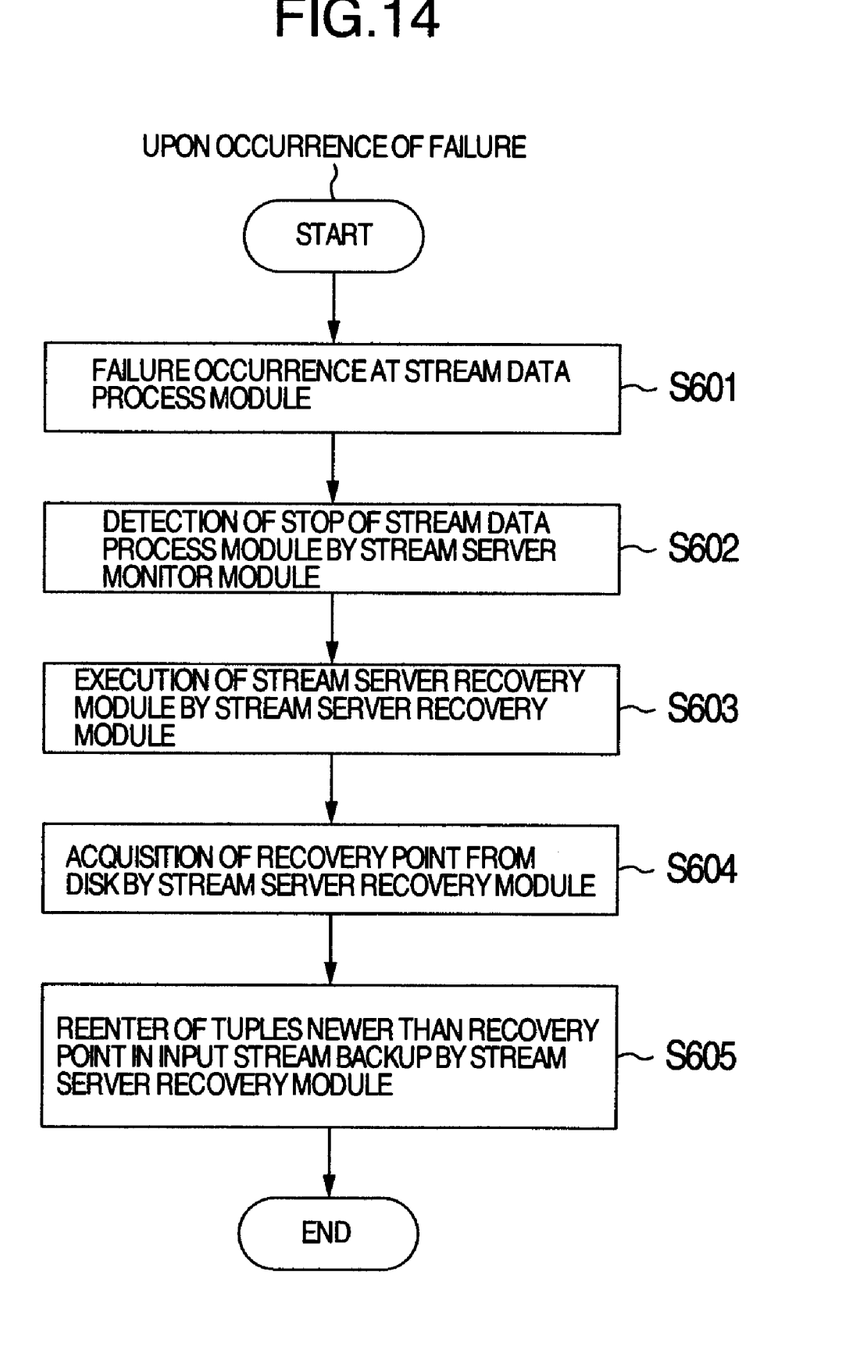
FIG. 14 is a flow chart illustrating a recovery process for an input stream 16 to be executed by a stream server recovery module 26 of the embodiment.
Figure 15:
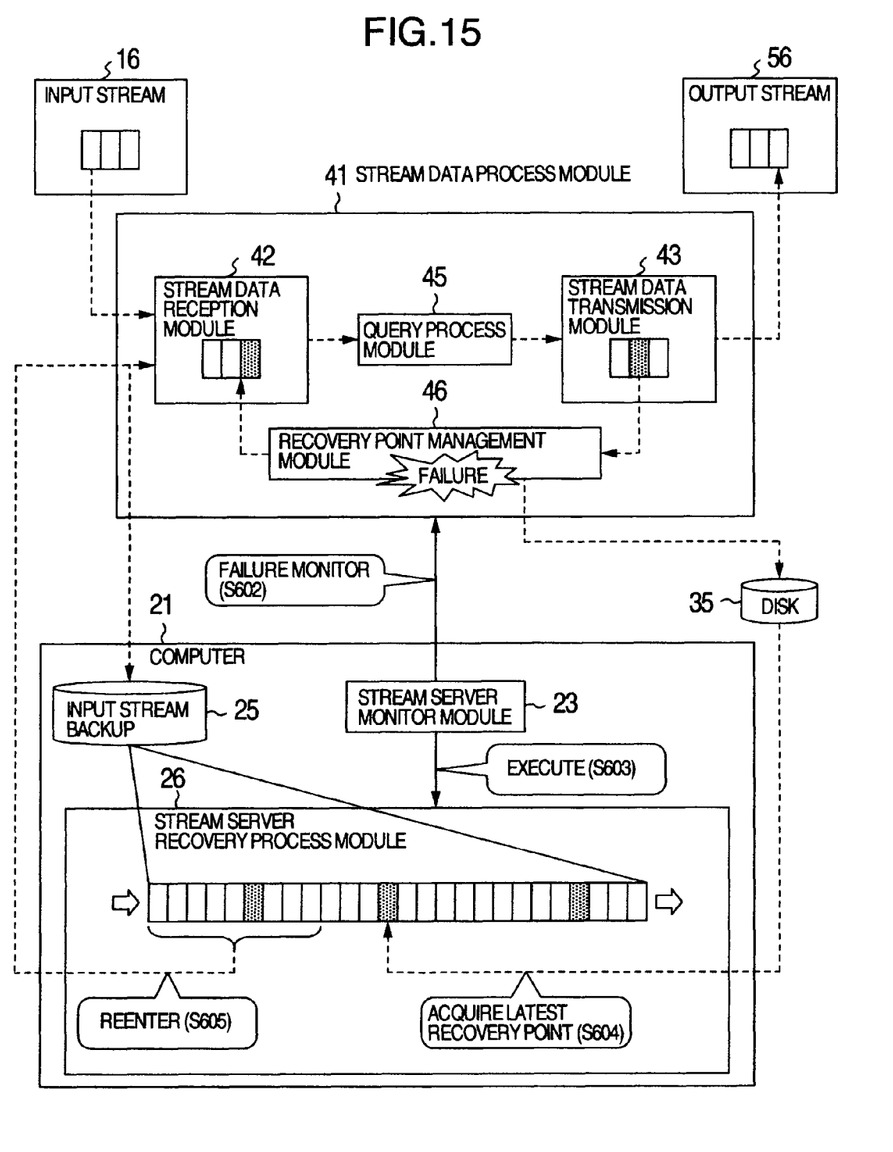
FIG. 15 is a diagram illustrating the process of the flow chart in FIG. 14 of the embodiment.

FIG. 14 is a flow chart illustrating a recovery process for an input stream 16 to be executed by the stream server recovery process module 26 upon occurrence of a failure. FIG. 15 is a diagram illustrating the process by the flow chart. With reference to FIGS. 14 and 15, a recovery process for the input stream 16 will be described.

At S601 a failure occurs at the stream data process module.

At S602 the stream server monitor module 23 detects a stop (failure) of the stream data process module.

At S603 the stream server recovery module 26 is executed upon detection at S602.

At S604 the stream server recovery module 26 acquires the latest recovery point from the disk 35. The disk 35 stores information on an already output recovery point tuple 61.

At S605 the stream server recovery module 26 recovers the stream data process module 41 by reentering, as the input stream 16, data tuples corresponding to times newer than the time indicated by the acquired recovery point 62 into the stream data process module 41.

According to the embodiment described so far, when a failure of the stream data process module 41 is recovered by using the input stream backup 25, the position of the data tuple to be reentered from the input stream backup 25 can be identified.

To this end, the recovery point designation module 17 and stream data reception module 42 adds the recovery point tuple 61 to the input stream 16. When the stream data process module 41 outputs the recovery point tuple 61, the recovery point management module 46 outputs the recovery point 62 to the disk 35. When a failure occurs, the data tuples after the time point indicated by the latest recovery point are acquired from the input stream backup 25 and reentered as a new input stream 16. The stream data process module can therefore be recovered.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A stream recovery method for a stream processing system using a stream distribution apparatus for distributing stream data, a stream processing apparatus for performing a query process of said distributed stream data, and a failure recovery apparatus for performing control for reentering said stream data to be lost by failure occurrence at said stream processing apparatus into said stream processing apparatus, wherein:

said stream data is structured including data tuples as a query process target and a recovery point tuple for indicating a position of said data tuples in said stream data;

said stream processing apparatus performs the query process for said data tuples, excludes said recovery point tuple from the query process and temporarily pools said recovery point tuple in a buffer, when in said stream processing apparatus at least one of said data tuples is instructed to be deleted, reads said recovery point tuple positioned before said data tuples as a deletion instruction target, and writes position information in said stream data indicated by said recovery point tuple in storage means; and said failure recovery apparatus reads position information in said stream data from said storage means upon detection of a failure that occurred in said stream processing apparatus, uses position information positioned lastly among said read position information, as a reenter position in said stream data, and instructs said stream distribution apparatus to reenter said stream data starting from said reenter position into said stream processing apparatus.

2. The stream recovery method according to claim 1, wherein said stream distribution apparatus structures said stream data by using position information input by a user via input means as an addition position of said recovery point tuple in said stream data.

3. The stream recovery method according to claim 1, wherein said stream processing apparatus judges whether a predetermined addition condition is satisfied, and when said predetermined addition condition is satisfied, inserts said recovery point tuple into said stream data received from said stream distribution apparatus.

4. The stream recovery method according to claim 3, wherein said stream processing apparatus inserts said recovery point tuple each time a data amount of said received stream data becomes a predetermined amount, as said predetermined addition condition.

5. The stream recovery method according to claim 3, wherein said stream processing apparatus inserts said recovery point tuple each time a predetermined time lapses, as said predetermined addition condition.

6. The stream recovery method according to claim 3, wherein said stream processing apparatus inserts said recovery point tuple each time a load on hardware of said stream processing apparatus increases by a predetermined amount or more, as said predetermined addition condition.

7. The stream recovery method according to claim 1, wherein said stream processing apparatus, when a branch process is performed in said query process, copies said recovery point tuple at each branch, and when all recovery point tuples are read from said buffer upon the deletion instruction, writes the position information in said stream data indicated by said recovery point tuples into said storage means.

8. The stream recovery method according to claim 1, wherein:

said recovery point tuple loads a stream ID for identifying said stream data to which said recovery point tuple belongs;

said stream processing apparatus writes position information in said stream data into said storage means for each stream ID; and said failure recovery apparatus reads the position information from said storage means for each stream ID, and uses the position information positioned at the front among said read position information, as a reenter position in said stream data.

9. A non-transitory computer readable storage medium storing a program for realizing a write function and an instruction function in a computer for receiving stream data structured including data tuples as a query process target and a recovery point tuple for indicating a position of said data tuples in said stream data from a stream distribution apparatus as a distribution source of said stream data and performing the query process, wherein:

said write function performs the query process for said data tuples, excludes said recovery point tuple from the query process and temporarily pools said recovery point tuple in a buffer, when in a stream processing apparatus at least one of said data tuples is instructed to be deleted, reads said recovery point tuple positioned before said data tuples as a deletion instruction target, and writes position information in said stream data indicated by said recovery point tuple in storage means; and said instruction function reads position information in said stream data from said storage means upon detection of a failure that occurred in said stream processing apparatus, uses position information positioned lastly among said read position information, as a reenter position in said stream data, and instructs said stream distribution apparatus to reenter said stream data starting from said reenter position into said stream processing apparatus.

10. A failure recovery apparatus in a stream processing system using a stream distribution apparatus for distributing stream data, a stream processing apparatus for performing a query process of said distributed stream data, and a failure recovery apparatus, comprising a CPU, for performing control for reentering said stream data to be lost by failure occurrence at said stream processing apparatus into said stream processing apparatus, wherein:

said stream data is structured including data tuples as a query process target and a recovery point tuple for indicating a position of said data tuples in said stream data; and upon detection of a failure at said stream processing apparatus, the failure recovery apparatus reads, via the CPU, position information in said stream data indicating a position of said data tuples already subjected to the query process at said stream processing apparatus from storage means, uses position information positioned lastly among said read position information, as a reenter position in said stream data, and instructs said stream distribution apparatus to reenter said stream data starting from said reenter position into said stream processing apparatus.

* * * * *